OPTICAL DEMODULATION APPARATUS

Filed Jan. 23, 1961 2 Sheets-Sheet 1

INVENTOR.
DENNIS GABOR

BY
Brumbaugh, Free, Graves & Donohue
his ATTORNEYS.

Oct. 29, 1963 D. GABOR 3,108,383

OPTICAL DEMODULATION APPARATUS

Filed Jan. 23, 1961 2 Sheets-Sheet 2

INVENTOR.
DENNIS GABOR

BY

Brumbaugh, Free, Graves & Donohue his ATTORNEYS.

United States Patent Office 3,108,383
Patented Oct. 29, 1963

3,108,383

OPTICAL DEMODULATION APPARATUS

Dennis Gabor, London, England, assignor to Columbia Broadcasting System, Inc., New York, N.Y., a corporation of New York Filed Jan. 23, 1961, Ser. No. 84,220
14 Claims. (Cl. 35—2)

This invention generally relates to optical means for directly decoding encoded information carried by a record medium. More particularly, it has to do with optical means for translating encoded graphical information, expressed as a function of the spacing between indicia carried by the record medium, into graphical information expressed as a function of light intensity at various points in an area, thus to produce an image suitable for human recognition.

It has been proposed heretofore to translate electrical signals representing a television picture, for example, into graphical information on film by modulating the intensity of the film exposing beam of a flying spot scanner or like device in accordance with frequency modulated signals from television transmitting equipment. Such a frequency modulated system is disclosed in the copending patent application of Peter C. Goldmark and Renville H. McMann, Jr., Serial No. 77,916, filed December 23, 1960, for "Film Recording Reproducing Apparatus," and assigned to the assignee of the present application. It produces a record comprising a plurality of dotted lines extending transversely of a photographic film, the spacing between the adjacent dots in each line across the film being a function of the instantaneous frequency modulated in accordance with picture information received from television pickup equipment. A system of the foregoing character has the advantage of being independent of the characteristics of the film emulsion, since the light transmissivity of the exposed and developed film is not used as an indication of the stored signals. However, the film record produced when viewed directly by an unskilled observer appears only as a series of apparently meaningless dots randomly spaced on the film, so that editing of the film for splicing deletions of certain portions of a program and the like may not be easy.

Therefore, it is an object of the invention to provide optical means for directly decoding encoded information carried by a record medium.

Another object of the invention is to provide optical means for directly translating encoded graphical information in the form of variably spaced indicia on a photographic film into a visible picture suitable for viewing by the human observer, without requiring, however, the use of expensive and complex equipment.

Broadly speaking, these and other objects of the invention are achieved by utilizing a film record of the type described above essentially as a diffraction grating to diffract parallel rays of light from a monochromatic source at various angles, and by providing a lens and a mask system that selectively modifies the intensity of the light diffracted at certain selected angles, in such fashion as to produce directly a visible reproduction of the information carried by the film record in encoded form.

In a preferred embodiment, the record strip carrying the coded information is disposed in the optical plane of a lens system of the type commonly used in microscopes and is illuminated with parallel monochromatic light. The record strip diffracts the light directed thereto with the result that a series of parallel lines generally normal to the dotted line record are produced in the rear focal plane of the optical system for each order of diffraction. These lines are displaced different distances laterally from the optical axis of the lens system, depending upon the dot spacings they represent. The line in each series that is closest to the optical axis represents a dot spacing corresponding to black, whereas the line farthest away from the axis represents a dot spacing corresponding to white.

In the rear focal plane of the lens system is a mask having optical transmissivity patterns at the locations of the aforementioned series of lines that correspond to the brightness intensities represented thereby. The modified light passing through the mask forms an image in an image plane which can be viewed through an objective. Thus, the variably spaced dots on the record strip are translated into an intensity modulated image suitable for human recognition.

Although the invention has been described above in general terms, a better understanding of it may be obtained from the following detailed description when taken in conjunction with the appended drawings in which.

Figures 2, 4A, 4B, 5:
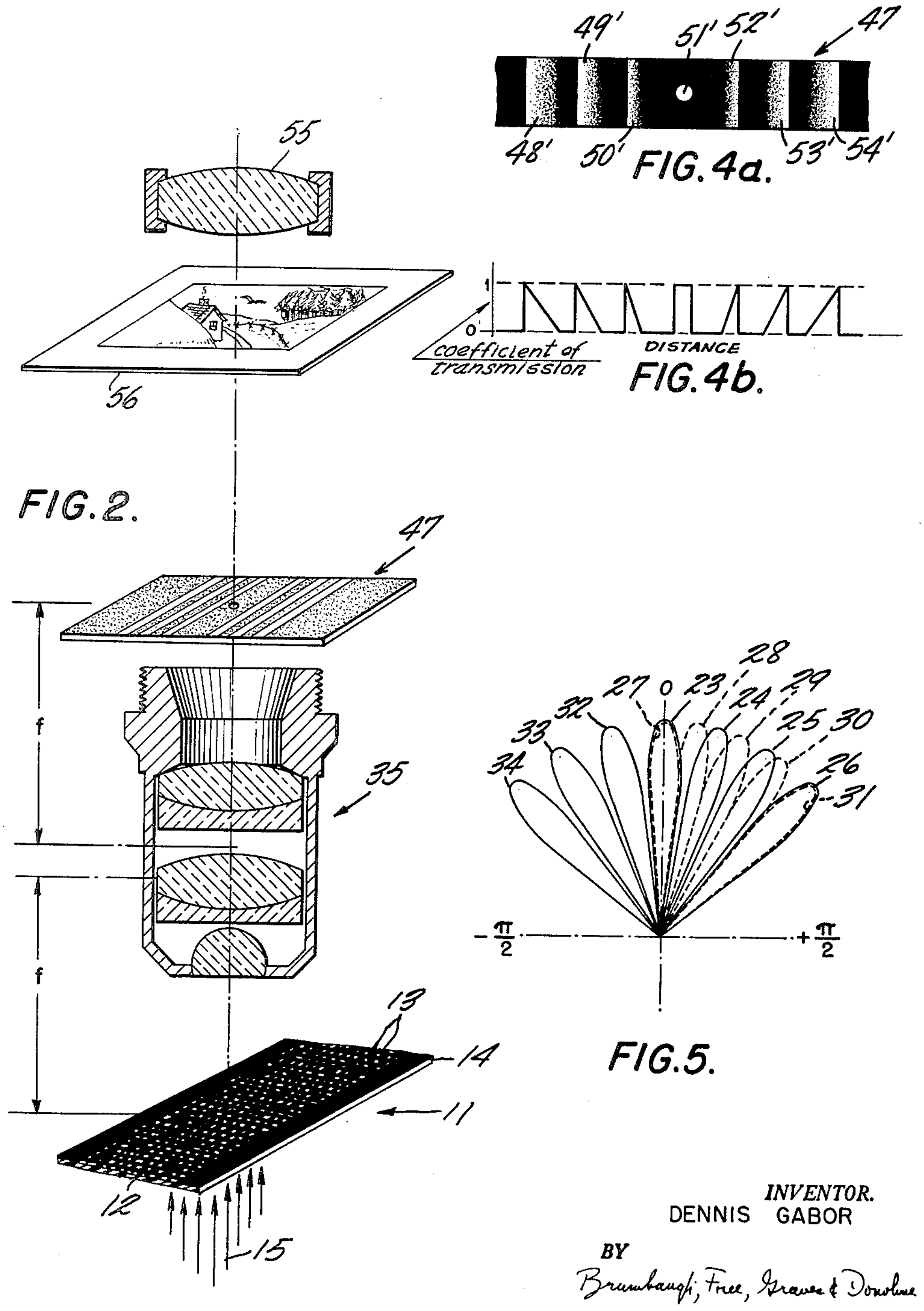
FIG. 2 is a partly pictorial and partly sectional view of a preferred embodiment of the present invention.

FIG. 4*a* is a top view of an optical filter or mask used in the apparatus shown in FIG. 2;

FIG. 4*b* is a graphical representation of the light transmissive characteristics of the optical filter of FIG. 4*a*; and FIG. 5 is a polar diagram of light intensity for various orders of diffraction of light diffracted by two pairs of differently spaced holes in an opaque surface.

Figure 1:
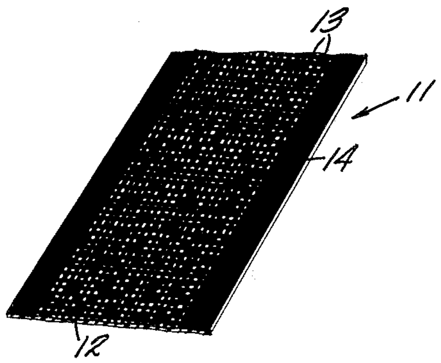
FIG. 1 is a pictorial representation on an exaggerated scale of a strip of film having video information recorded thereon.

Referring now to FIG. 1, a film 11 is depicted that contains picture information recorded thereon in the manner described in the aforementioned copending application Serial No. 77,916. The record on the film 11 preferably comprises a series of lines 12 of transparent dots 13 on an opaque background 14. Each line across the width of the film corresponds to a conventional television scanning line in a given frame of a television picture, and the spacing between adjacent dots in a given line, i.e., the instantaneous period of the recorded waveform, is indicative of the brightness of the original picture element at that point in the line. Since the period of the recorded waveform is the dependent variable in this system of recording information, a film record of this character is not likely to present any recognizable picture to an untrained observer.

FIG. 2 depicts apparatus for optically translating such recorded information into a form suitable for viewing with comprehension by a human observer. As shown in the figure, parallel beams 15 of monochromatic light, i.e., light of a single frequency, from a source of light (not shown), such as a sodium lamp, for example, are directed through the film 11. The film 11 functions in a manner similar to a diffraction grating and diffracts the light beams 15 from the source as best explained below with reference to FIGS. 3 and 5.

Figure 3:
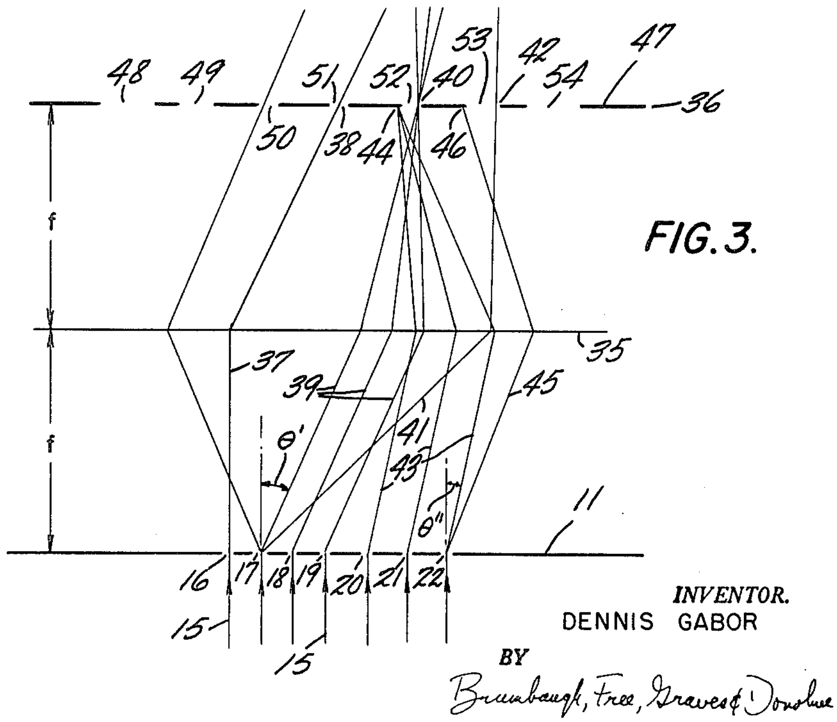
FIG. 3 is a diagram useful in understanding the principles of the invention.

Referring to FIG. 3, a portion of film 11 is shown in which transparent dots 16 through 19 are displaced from each other a distance D, and transparent dots 19 through 22 are displaced from each other a distance ⅘ D, for example. According to the principles of diffraction, the angle $\theta$ at which monochromatic light of wavelength $\lambda$ is diffracted by such a grating is governed by the relation:

$$\sin \theta = \frac{n\lambda}{d} \qquad (1)$$

where $n$ is any integer 0, $\pm1$, $\pm2$, $\pm3$ . . . , which gives the order of diffraction, and $d$ is the spacing between adjacent dots.

Thus, as may be seen from FIG. 3, light is diffracted by the dots 16 through 19 at an angle $\theta'$, whereas light is diffracted by dots 19 through 22 at an angle $\theta''$. It will be understood that in each case the angle of diffraction lies in a plane containing the scanning line comprising the dots 16 through 22.

FIG. 5 is a polar diagram of the intensity of the light transmitted through a grating of the type shown in FIG. 3 for various angles of diffraction. For simplicity, two pairs of differently spaced adjacent dots have been taken to constitute the grating. Thus, the solid line curves represent the light diffracted by a pair of adjacent dots spaced apart a distance D, while the dashed line curves represent the light diffracted by a pair of adjacent dots spaced apart a distance ⅔ D, for example. As may be seen, the diagram comprises a series of fan-shaped loops, each one of which represents an order of diffraction. For example, solid line lobes 23 through 26 represent, respectively, the 0, +1, +2, and +3 orders of diffraction of light diffracted by the two dots spaced distance D, whereas the dashed line lobes 27 through 31 represent, respectively, the 0, +1, +2, +3, and +4 orders of diffraction produced by the two dots spaced apart a distance ⅔ D. Similarly, the solid line lobes 32, 33 and 34, represent, respectively, the −1, −2, and −3 orders of diffraction of light diffracted by the dots spaced apart a distance D.

In FIG. 5, the maximum light transmitted for any order of diffraction corresponds to the tip of the appropriate lobe. The tips all appear at angles corresponding to the angles of diffraction given by Equation 1. In this respect, it should be noted that since diffraction is caused by a pair of spaced dots, rather than by an ideal diffraction grating whose analysis leads to Equation 1, the fan-shaped lobes of FIG. 5 result, rather than single lines angularly spaced about the origin of the figure.

The film 11 is disposed in the object plane of a lens system 35 of the type commonly employed in microscopes, as shown in FIG. 2. The lens system 35 causes the several orders of diffracted light to form characteristic patterns on its rear focal plane 36. Thus, in FIG. 3, zero order diffracted light represented by the beam 37 produces a single luminous spot 38 at the intersection of the optical axis with the rear focal plane. Similarly, parallel beams 39, corresponding to the first order of diffraction of light produced by all dots spaced apart a distance D, form a short luminous line 40 which extends perpendicular to the direction of the dotted lines on the record strip and is displaced laterally a characteristic distance from the optical axis. Likewise, parallel beams 43 corresponding to the first order of diffraction of light produced by dots spaced apart a distance ⅔ D also form a short luminous line 44, parallel to the line 40, which is laterally displaced from the optical axis by a different characteristic distance. In fact, light diffracted by dots having any given spacing between D and ⅔ D will form a line parallel to the lines 40 and 44 and located correspondingly between.

Similar sets of lines are formed in the rear focal plane of the lens system 35 for several orders of diffraction produced by the film record 11. Thus, the positive first, second and third orders of diffraction will produce such groups of lines at locations 52, 53 and 54 on the rear focal plane, while the negative first, second and third orders of diffraction will produce the same result at the locations 50, 49 and 48, respectively.

It will be recalled that the spacing D between adjacent ones of the dots 16 through 19 in FIG. 3 corresponds to white, the spacing ⅔ D between adjacent ones of the dots 19 through 22 corresponds to black, and that any value of dot spacing between D and ⅔ D corresponds a shade of gray in the gray scale between black and white. By the same token, for the first order of diffraction, the positions in the rear focal plane where the lines 40 and 44 are formed represent white and black, respectively, and any line position therebetween represents a shade of gray in a gray scale between white and black. The positions of luminous lines formed in the rear focal plane for other orders of diffraction represent similar gray scales ranging from white to black.

In order to produce a recognizable image from the film record 11, a mask 47 (FIGS. 2 and 3) of suitably selected light transmission properties is positioned in the rear focal plane of the lens system. Referring to FIG. 4*a*, the mask 47 comprises a number of zones 48′ through 50′ and 52′ through 54′ which are adapted to be positioned in exact registry with the respective locations 48, 49, 50, 52, 53 and 54 (FIG. 3) where the several sets of luminous lines appear, and a transparent portion 51′ at the intersection of the optical axis with the rear focal plane of the lens system, which preferably is circular as shown in FIG. 4*a*. Each zone, which extends generally normally to the lines 12 of the film 11, is graded with respect to its light amplitude transmissive characteristics, as shown in FIG. 4*b*. Thus, considering zones 52′, 53′, and 54′, the light amplitude transmissive characteristics vary linearly from complete opacity at the left-hand edge of each zone to complete transparency at the right-hand edge of each zone, so that the intensity transmission varies with the square of this. Furthermore, the spacing of the zones is such that, for small angles of diffraction, the midpoint of each zone $n$ lies a distance S from the center of the mask that is given by the following equation:

$$S=\frac{f\lambda n}{2}\left(\frac{1}{d_{\mathrm{min.}}}+\frac{1}{d_{\mathrm{max.}}}\right) \qquad (2)$$

where $f$ is the focal length of the lens system 35, $d_{\mathrm{min.}}$ is the minimum spacing between adjacent dots 13 in any line 12 of film 11, and $d_{\mathrm{max.}}$ is the maximum spacing between such adjacent dots.

The width W of any zone $n$ for small angles of diffraction is given by the equation:

$$W=\lambda f|n|\left(\frac{1}{d_{\mathrm{min.}}}-\frac{1}{d_{\mathrm{max.}}}\right) \qquad (3)$$

With the mask 47 positioned in the rear focal plane of the lens system 35, as shown in FIGS. 2 and 3, diffracted light of zero order passes through the aperture 51′ and establishes a reference background for the picture being reproduced. First order diffracted light from the dots 16 through 19 of the film 11, which correspond to a "white" portion of a television image, is allowed to pass unimpeded through the mask. However, light from the dots 19, 20, 21 and 22 which correspond to a "black" portion of a television image, impinges upon the left-hand or opaque portion of the zone 52′, and is completely blocked. Other beams of light of the first order of diffraction, for example, corresponding to a "gray" portion of a television image, impinge upon the middle or translucent portion of the zone 52′, and are selectively reduced in intensity according to the angle of diffraction. Diffracted light of other orders is similarly modified in intensity by the portions 48′, 49′, 50′, 53′ and 54′.

As shown in FIG. 2, the modified light that is transmitted through the mask 47 forms a recognizable image in a plane 56 which is viewed by an eye piece 55. Due to overlapping of various orders of diffraction associated with differently spaced dots, as shown in FIG. 5, the image may not be as sharp as it might be if produced by elaborate and complex scanning techniques. However, a degree of resolution of about 400 picture elements per line can be achieved with the apparatus which is entirely sufficient for editing of the film strip. For this purpose, the clarity of the picture is more than ample, and the simplicity of the viewing system justifies the slight loss in picture clarity.

The resolution can be improved somewhat by eliminating the first or the first two orders of definition as by blackening out the zones 49, 50, 52 and 53. This corresponds to the technique known as "crispening" in television practice, by cutting out certain of the low frequencies, and showing outlines at the expense of fine gradation.

The clarity of the reproduced image may be further improved by varying the size of the circular transparent portion 51 of the mask 47, thus to vary the degree of "background" provided in the picture. Furthermore, the parallel rays of monochromatic light 15 may be skewed with respect to film 11 rather than being directed perpendicularly thereto. In this fashion, the aperture of the lens system 35 may be reduced, since the size of the field is effectively reduced.

In a practical case, television program material 525 lines, 60 fields, 30 frames per second may be recorded on a film strip 11, 6.3 mm. wide moving at a speed of 7½ inches (190 mm.) per second, the length of the recorded line 12 being 5 mm. For good separation, the line width may be six microns with six micron spacing between adjacent lines. The frequency modulated record on the film strip 11 may be such that "white" corresponds to a frequency of 6.8 megacycles per second and "black" to 5 megacycles per second, corresponding periods or spacings between adjacent dots being 11.6 microns for "white" and 15.7 microns for "black."

For a record strip having the characteristics described above, an optical system 35 having a focal length of 25 mm. and a sodium light source ($\lambda$=0.596 micron), each of the zones 50 and 52 on the mask 47 should be located between 0.95 mm. and 1.27 mm. from the optical axis and so graded that there is full transmission at 1.27 mm. and zero transmission at 0.95 mm. In similar fashion, the second order zones 49 and 53 should each be located between 1.9 mm. and 2.54 mm. from the optical axis and the third order zones between 2.85 mm. and 3.8 mm. from the axis. Outside these graded zones, the mask 47 is entirely blacked out.

Although the invention has been described above in general terms, it is quite apparent that numerous additions, substitutions, and modifications to the preferred embodiment shown may be made. For example, various masks may be employed in which selected orders of diffraction are utilized, and various degrees of grading may be provided in the zones of the masks for varying the aspect of the reproduced picture. Such changes, however, should be deemed to be well within the scope of the invention as it is defined in the following claims.

I claim:

1. In apparatus for decoding information encoded on a record medium, the combination of an optical system having front and rear focal planes and adapted to reproduce at an image plane an image of an object at said front focal plane when said object is irradiated with radiant energy, and a mask at said rear focal plane having a plurality of zones each having different radiant energy transmissive properties at different locations thereon for selectively modifying the radiant energy that passes through the record medium when the record medium is positioned in said front focal plane and irradiated with radiant energy.

2. In apparatus for decoding information encoded on a record medium, the combination of an optical system having front and rear focal planes and adapted to reproduce at an image plane an image of an object at said front focal plane when said object is irradiated with radiant energy, a source of parallel ray monochromatic radiant energy for irradiating the record medium in said front focal plane, and a mask at said rear focal plane having a plurality of zones each having different radiant energy transmissive properties at different locations thereon for selectively modifying the monochromatic radiant energy that passes through the record medium.

3. In apparatus for decoding information carried by a record medium essentially in the form of a diffraction grating, the combination of an optical system having front and rear focal planes and adapted to reproduce at an image plane an image of a record medium at said front focal plane, a source of parallel ray monochromatic radiant energy for irradiating a record medium in said front focal plane whereby diffraction of said radiation will be effected in accordance with the information-carrying periodicities in said record medium, and a mask in said rear focal plane having a plurality of zones each having different radiant energy transmission properties at different locations thereon to convert radiant energy diffracted to different degrees corresponding to different periodicities in the record medium into related transmitted radiant energy intensities, thereby to form in said image plane a visual image of information carried by said record medium.

4. In a system in which information is recorded as variations in spacing between record elements on a record medium, said record elements each having a light transmissive characteristic that differs from the light transmissive characteristic of the remainder of said record medium, means for translating said information into a form in which light intensity is a dependent variable comprising means for directing parallel beams of light of a single frequency toward one side of said surface, means positioned on the other side of said surface for directing groups of those of said beams transmitted through said surface that are parallel to each other to locations in a plane, said locations in said plane being dependent upon the directions of propagation of said transmitted groups of parallel beams, a mask located in said plane having a plurality of zones in each of which light transmissivity varies at different locations thereby selectively to reduce the intensity of selected ones of said groups of parallel beams transmitted through said mask, and means for viewing an image produced from said beams transmitted through said mask.

5. In a system in which information is recorded in a series of successive lines extending across a film, the information in a given line being recorded as variations in spacing between portions of said line that have a light transmissivity different from the light transmissivity of the remainder of said line, means for translating said information into a form in which light intensity at a point in a line is the dependent variable comprising means for projecting parallel beams of light of a single frequency toward one side of said film, first lens means positioned on the other side of said film for directing different groups of parallel beams of light transmitted through said film to various locations in the rear focal plane of said first lens means, a mask positioned in said rear focal plane, said mask comprising a plurality of zones each of which has portions thereof of different light transmissivity thereby selectively to reduce the intensity of selected ones of said groups of parallel beams of light, and a second lens means for viewing an image from said beams of light transmitted through said mask.

6. Apparatus as recited in claim 5 in which said mask comprises a plurality of bands that extend in a direction perpendicular to the lines recorded on said film, said bands being of widths related to the maximum deviation in spacing of adjacent ones of said portions of said lines.

7. In combination with apparatus as recited in claim 6, a first edge of each of said bands lying a distance from a reference line of said mask that is related to the minimum spacing between adjacent ones of said portions of said lines, the other edge of each of said bands lying a distance from said reference line that is related to the maximum spacing between adjacent ones of said portions of said lines, each of said bands having a light transmissivity that varies across said band from a first value at said first edge to a second value at said other edge.

8. Apparatus as recited in claim 5 in which said mask comprises a plurality of substantially rectangularly shaped light transmissive zones, each of said zones extending lengthwise in a direction perpendicular to the direction in which said lines of said film extend, each of said zones being substantially of a width equal to $$f\lambda|n|\left(\frac{1}{d_{\mathrm{min.}}}-\frac{1}{d_{\mathrm{max.}}}\right)$$

where $f$ is the focal length of said first lens means, $\lambda$ is the wavelength of said light, $n$ is the number of said zone, said number being any integer from one to plus or minus infinity, $d$ min. is the minimum spacing between any two adjacent ones of said portions of said lines of said film, and $d$ max. is the maximum spacing between any two adjacent ones of said portions of said lines of said film, the midpoints of each of said zones lying substantially a distance $$\frac{f\lambda n}{2}\left(\frac{1}{d_{\min.}}+\frac{1}{d_{\max.}}\right)$$

from the centerline of said mask.

9. Apparatus as recited in claim 8 in which the light amplitude transmissivity of each of said zones is graded substantially linearly across the width of said zone with one edge of said zone being substantially opaque and the other edge of said zone being substantially transparent.

10. Apparatus as recited in claim 8 in which said mask is further characterized by a substantially circular transparent portion located substantially at the center of said mask.

11. Apparatus for the translation of information recorded as a series of points variably spaced adjacent each other in a line of such points into information recorded as a light intensity at a series of positions in a line, comprising means for employing said points as a diffraction grating for a source of monochromatic light, means for directing groups of parallel beams of said monochromatic light diffracted by said points to various locations dependent upon the degree of diffraction of said light, and a mask having a plurality of zones each of graded light transmissivity for masking selected ones of said locations thereby selectively to reduce the light intensity of selected ones of said diffracted beams.

12. Apparatus as recited in claim 11 in which said means for masking comprises an opaque mask having a zone therein that is substantially rectangular in shape, the length of said zone extending perpendicularly to said line of said points, the width of said zone being defined by a first edge whose location from a centerline of said mask is related to the minimum spacing between adjacent points in said line and a second edge whose location from said centerline is related to the maximum spacing between adjacent points in said line.

13. Apparatus as recited in claim 12 in which the light transmissivity characteristics of each of said zones is graded substantially from opacity at one edge of said zone to transparency at the other edge of said zone.

14. Apparatus as recited in claim 13 in which said mask contains a substantially transparent portion located substantially at the center of said mask for passing zero order components of said diffracted beams of light.

References Cited in the file of this patent

UNITED STATES PATENTS

| | | |
|---|---|---|
| 2,425,006 | Rosen | Aug. 5, 1947 |
| 2,770,166 | Gabor | Nov. 13, 1956 |
| 2,813,146 | Glenn | Nov. 12, 1957 |
| 2,950,648 | Rhodes | Aug. 30, 1960 |
| 2,977,847 | Meyer-Arendt | Apr. 4, 1961 |